US011935262B2

United States Patent
Bade et al.

(10) Patent No.: US 11,935,262 B2
(45) Date of Patent: Mar. 19, 2024

(54) METHOD AND DEVICE FOR DETERMINING A PROBABILITY WITH WHICH AN OBJECT WILL BE LOCATED IN A FIELD OF VIEW OF A DRIVER OF A VEHICLE

(71) Applicant: Bayerische Motoren Werke Aktiengesellschaft, Munich (DE)

(72) Inventors: Florian Bade, Munich (DE); Moritz Blume, Munich (DE); Martin Buchner, Munich (DE); Carsten Isert, Munich (DE); Julia Niemann, Berlin (DE); Michael Wolfram, Poing (DE); Joris Wolters, Amersfoort (NL)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 237 days.

(21) Appl. No.: 16/796,684

(22) Filed: Feb. 20, 2020

(65) Prior Publication Data
US 2020/0193629 A1 Jun. 18, 2020

Related U.S. Application Data

(63) Continuation of application No. PCT/EP2018/062678, filed on May 16, 2018.

(30) Foreign Application Priority Data

Aug. 21, 2017 (DE) .................... 10 2017 214 545.5

(51) Int. Cl.
*G06T 7/70* (2017.01)

(52) U.S. Cl.
CPC ...... *G06T 7/70* (2017.01); *G06T 2207/20076* (2013.01); *G06T 2207/30196* (2013.01);
(Continued)

(58) Field of Classification Search
CPC ............. G06T 7/70; G06T 2207/20076; G06T 2207/30196; G06T 2207/30252; G06T 2207/30268
See application file for complete search history.

(56) References Cited

U.S. PATENT DOCUMENTS 9,139,201 B2 * 9/2015 Nagata ..................... B60T 7/22
9,164,511 B1 * 10/2015 Ferguson .............. B60W 40/06
(Continued)

FOREIGN PATENT DOCUMENTS

CN   103770733 A   5/2014
CN   104169136 A   11/2014
(Continued)

OTHER PUBLICATIONS

S. Li, "Monitoring Around a Vehicle by a Spherical Image Sensor," in IEEE Transactions on Intelligent Transportation Systems, vol. 7, No. 4, pp. 541-550, Dec. 2006, doi: 10.1109/TITS.2006.883116.*
(Continued)

*Primary Examiner* — Shaghayegh Azima
(74) *Attorney, Agent, or Firm* — Crowell & Moring LLP

(57) ABSTRACT

A method where one or more objects of a three-dimensional scene are determined in accordance with provided raw data of the three-dimensional scene representing a predefined environment inside and/or outside the vehicle. A two-dimensional image is determined in accordance with the provided raw data of the three-dimensional scene such that the two-dimensional image depicts the determined objects of the three-dimensional scene on a curved plane. The two-dimensional image has a quantity of pixels, each representing at least one part or several of the determined objects of the three-dimensional scene. Data is provided which represents at least one determined field of view of the driver. For at least one of the determined objects, the probability with which the at least one object will be located in the field of
(Continued)

view of the driver is determined in accordance with the provided data and the two-dimensional image.

14 Claims, 4 Drawing Sheets

(52) U.S. Cl.
CPC ............... *G06T 2207/30252* (2013.01); *G06T 2207/30268* (2013.01)

(56) References Cited

U.S. PATENT DOCUMENTS

| | | | |
|---|---|---|---|
| 9,802,540 B2 * | 10/2017 | Frommann | B60K 35/00 |
| 9,963,153 B2 * | 5/2018 | An | B60W 30/08 |
| 10,121,082 B2 * | 11/2018 | Heisele | B60R 1/00 |
| 10,140,775 B2 * | 11/2018 | Oba | G06T 19/20 |
| 11,037,303 B2 * | 6/2021 | Li | G06T 7/215 |
| 2014/0070934 A1 | 3/2014 | Chau et al. | |
| 2014/0152778 A1 * | 6/2014 | Ihlenburg | B60R 1/00 348/47 |
| 2015/0046058 A1 | 2/2015 | Nagata | |
| 2017/0103269 A1 | 4/2017 | Heisele et al. | |
| 2018/0068206 A1 * | 3/2018 | Pollach | G06V 20/56 |
| 2018/0307914 A1 * | 10/2018 | Moon | G06T 19/006 |
| 2018/0330526 A1 * | 11/2018 | Corcoran | H04N 23/60 |
| 2019/0171011 A1 * | 6/2019 | Ogasawara | G02B 27/0103 |
| 2019/0311523 A1 * | 10/2019 | Milz | G06T 3/005 |
| 2020/0193629 A1 * | 6/2020 | Bade | G06T 7/70 |
| 2021/0396886 A1 * | 12/2021 | Ronchini Ximenes | G01S 17/89 |

FOREIGN PATENT DOCUMENTS

| | | |
|---|---|---|
| CN | 105196918 A | 12/2015 |
| DE | 10 2009 022 278 A1 | 1/2010 |
| DE | 10 2009 002 979 A1 | 11/2010 |
| DE | 10 2013 217 405 A1 | 3/2014 |
| DE | 10 2013 206 739 A1 | 10/2014 |
| EP | 3 109 114 A1 | 12/2016 |
| JP | 2009-237776 A | 10/2009 |
| JP | 2011-198247 A | 10/2011 |
| WO | WO 2013/034182 A1 | 3/2013 |
| WO | WO2013034182 * | 3/2013 |
| WO | WO 2013034182 A1 * | 3/2013 |

OTHER PUBLICATIONS

PCT/EP2018/062678, International Search Report dated Aug. 27, 2018 (Two (2) pages).
German Search Report issued in German counterpart application No. 10 2017 214 545.5 dated Mar. 5, 2018, with Statement of Relevancy (Eleven (11) pages).
English-language Chinese Office Action issued in Chinese Application No. 201880047125.6 dated Jul. 5, 2022 (9 pages).

* cited by examiner

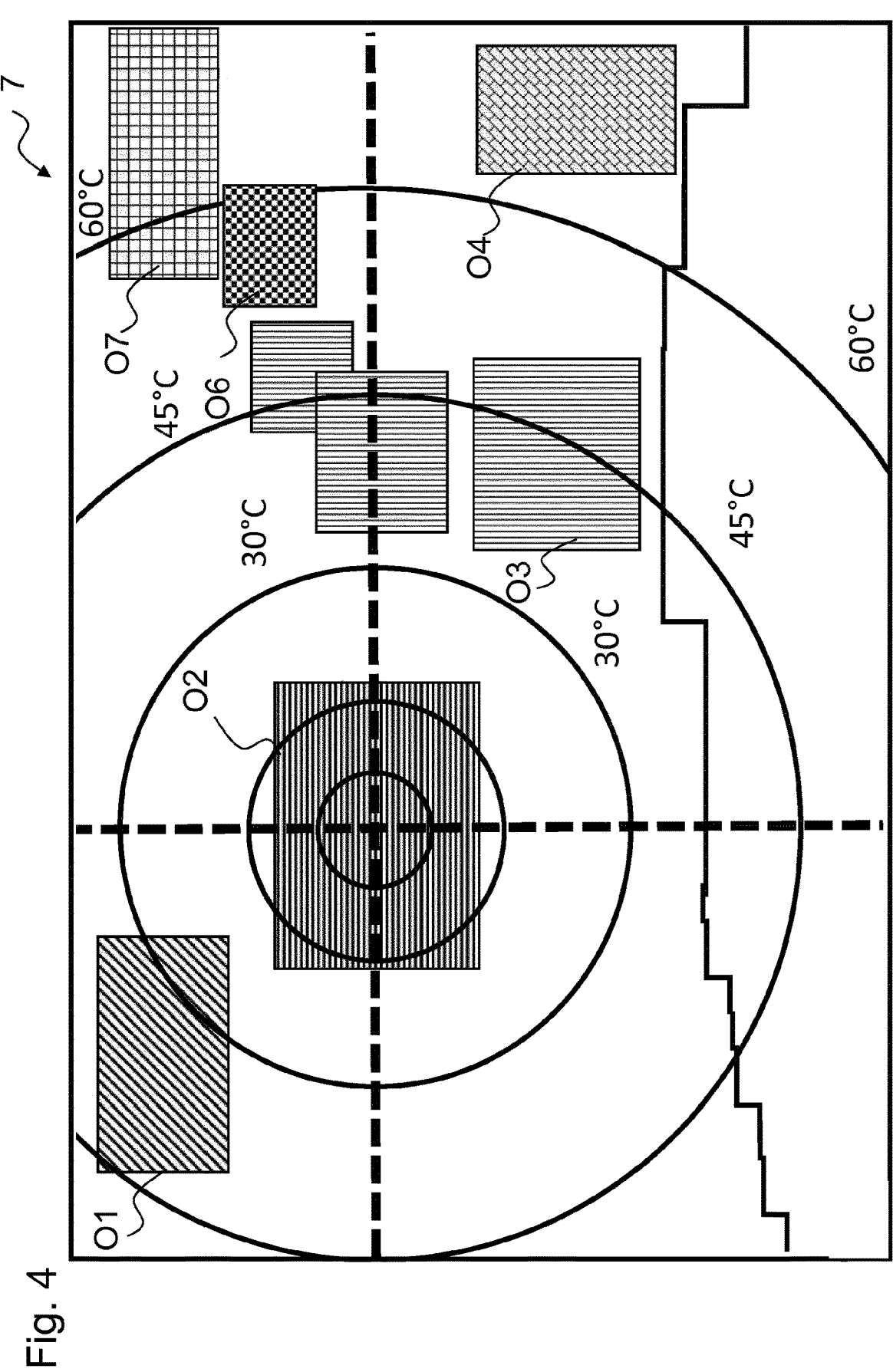

METHOD AND DEVICE FOR DETERMINING A PROBABILITY WITH WHICH AN OBJECT WILL BE LOCATED IN A FIELD OF VIEW OF A DRIVER OF A VEHICLE

CROSS REFERENCE TO RELATED APPLICATIONS

This application is a continuation of PCT International Application No. PCT/EP2018/062678, filed May 16, 2018, which claims priority under 35 U.S.C. § 119 from German Patent Application No. 10 2017 214 545.5, filed Aug. 21, 2017, the entire disclosures of which are herein expressly incorporated by reference.

BACKGROUND AND SUMMARY OF THE INVENTION

The invention relates to a method for ascertaining a probability with which an object is located in a field of view of a driver of a vehicle. The invention furthermore relates to an apparatus for ascertaining a probability with which an object is located in a field of view of a driver of a vehicle. The invention furthermore relates to a computer program and to a computer program product for ascertaining a probability with which an object is located in a field of view of a driver of a vehicle.

While early driver assistance systems such as anti-lock braking systems and electronic stability programs used to be limited to providing direct support to the vehicle control system, there are now a multitude of driver assistance systems that actively inform the driver about existing dangers. By improving vicinity capturing, the driver assistance system can detect and predict significantly more potential conflict situations and inform the driver about imminent situations of danger in a timely fashion. However, too many notifications and warnings can result in the driver being cognitively overburdened and may even distract the driver from the actual driving task. Furthermore, it must be assumed that the driver, if subjected to a multitude of unnecessary warnings, feels disturbed thereby or even feels that their driving competency is being criticized and consequently switches off the system. It may therefore be necessary to deliberately forego outputting warnings if an adequate driver reaction is expected even in the absence of such warnings.

Modern driver assistance systems for partially automated or highly automated driving therefore increasingly use an estimation of a situation awareness of the driver.

Such an estimation of the situation awareness is frequently based on an estimation of what it is the driver pays attention to. Since the driver in the vehicle is surrounded by many visual stimuli during a journey, it may be important depending on the situation to be able to estimate whether a specific object is visible to the driver and/or whether the specific object can be perceived by the driver.

The object on which the invention is based is the provision of a method and an apparatus that make it possible to reliably ascertain a probability with which an object is located in a field of view of a driver of a vehicle.

The invention is characterized in accordance with a first aspect by a method for ascertaining a probability with which an object is located in a field of view of a driver of a vehicle. The invention is characterized in accordance with a second aspect by an apparatus for ascertaining a probability with which an object is located in a field of view of a driver of a vehicle. In addition, the apparatus is configured to carry out the method or an implementation of the method.

In the method, one or more objects of a three-dimensional scene, which represents a specified environment inside and/or outside the vehicle, are ascertained in dependence on provided raw data of the three-dimensional scene. A two-dimensional image is ascertained in dependence on the provided raw data of the three-dimensional scene in a manner such that the two-dimensional image maps the ascertained objects of the three-dimensional scene onto a curved plane, wherein the two-dimensional image has a set of pixels that each represent at least one portion of one or more of the ascertained objects of the three-dimensional scene. Furthermore, data that represent at least one ascertained field of view of the driver are provided. The at least one ascertained field of view is here ascertained in dependence on at least one specified capture variable, which is captured in the vehicle using a specified capturing sensor system. For at least one of the ascertained objects, the probability with which the at least one object is located in the field of view of the driver, which can also be referred to as the real or actual field of view of the driver, is ascertained in dependence on the provided data and the two-dimensional image.

For the rendering, various methods can be used, for example ray casting and/or rasterization, etc. Ray casting refers to a method in which possible viewing rays are traced back. Rasterization, also referred to as scan conversion, denotes the conversion of a vector graphic into a raster graphic.

The objects of the three-dimensional scene comprise for example a traffic sign and/or a traffic light and/or a vehicle and/or a person and/or an operating element in the vehicle and so forth.

Mapping or rendering has the advantage that even occluded objects can be taken into consideration.

Furthermore, the method according to the invention permits a probabilistic statement to be made as to the probability with which the at least one object is located in the field of view of the driver. The probability with which the respective object is located in the field of view of the driver is preferably ascertained for all objects that are known to the vehicle.

In contrast to the ascertained field of view of the driver, the field of view of the driver corresponds to the real or actual field of view of the driver. The ascertained field of view can deviate from the real field of view due to capturing tolerances and/or model tolerances.

The field of view can comprise one or more field of view regions. In particular, the field of view can comprise a central field of view region and/or a peripheral field of view region. In the central field of view region, a central point of a retina is used to fix an object. In the peripheral field of view region, extrafoveal areas are used for perception.

Advantageously, it is thus possible for example to make statements with greater accuracy as to which objects the driver focuses on and/or where their visual attention is. In particular, it is thus possible to ensure improved quality for statements relating to whether the driver is suitably attentive as regards a driving situation.

In one advantageous implementation in accordance with the first and second aspects, the curved plane comprises or is at least one portion of a surface of a sphere, wherein a cyclops eye of the driver forms a center of the sphere. At least one portion of the ascertained objects of the three-dimensional scene is here mapped or rendered onto the surface of the sphere. The diameter of the sphere is of minor importance here, provided the diameter is sufficiently small, i.e., the sphere is so small that it does not comprise the objects that are to be mapped onto the surface.

In a further advantageous implementation in accordance with the first and second aspects, a region in the two-dimensional image that corresponds to the at least one ascertained field of view of the driver is ascertained. Furthermore, depending on a position of the object with respect to the ascertained region, it is ascertained whether the at least one ascertained object is located at least partially in the at least one ascertained field of view of the driver.

This advantageously makes a simple assignment of the at least one object to the at least one ascertained field of view of the driver possible. The at least one ascertained field of view of the driver is stored for example in a bitmap. In order to assign the at least one object to the at least one ascertained field of view of the driver, the two-dimensional image is correspondingly laid over the bitmap.

In a further advantageous implementation in accordance with the first and second aspects, the data represent a first ascertained field of view and at least one further ascertained field of view of the driver. A position of the first ascertained field of view deviates in this case from a position of the respective further ascertained field of view within a specified tolerance range. In each case one weight factor is assigned to the first ascertained field of view and to the respective further ascertained field of view, and the probability with which the at least one object is located in the "actual" field of view of the driver is ascertained in dependence on the respective weight factors.

In particular, the first and the at least one further field of view are ascertained such that in each case the position thereof is ascertained. The first ascertained field of view and the at least one further ascertained field of view can overlap.

The field of view that is to be ascertained in each case can be ascertained in particular in dependence on a captured head pose and/or a captured viewing direction and/or a captured position of the driver. Owing to specific anatomical and physiological features, errors may occur during the capturing of the captured head pose and/or of the captured viewing direction and/or of the captured position of the driver.

For example, the first ascertained field of view corresponds to a first captured and/or ascertained viewing direction of the driver, and the at least one further ascertained field of view corresponds to a further captured and/or ascertained viewing direction of the driver. For example, a hypothesis is put forward as to which viewing direction is the most probable, and the weight factor is accordingly assigned to the respective ascertained field of view.

The weight factors preferably indicate how often the case that the first ascertained field of view corresponds to the "real field of view" of the driver occurs as compared to the case that the at least one further field of view corresponds to the "real field of view" of the driver. The ascertained first field of view and the at least one further ascertained field of view can each be stored in a bitmap. The probabilistic assignment can be carried out by way of multiple, weighted mutual overlaying of the bitmaps.

In a further advantageous implementation in accordance with the first and second aspects, at least one portion of the pixels has a tuple of object identifiers. In particular, it is possible with the aid of the tuples to take transparent and/or occluded objects into consideration very easily in the two-dimensional image.

In a further advantageous implementation in accordance with the first and second aspects, the set of the pixels comprises first pixels, which each represent at least one portion of at least two of the ascertained objects of the three-dimensional scene. In each case one object identifier can be assigned to the at least one portion of the ascertained objects of the three-dimensional scene. The first pixels can each comprise a tuple with at least two object identifiers, which are assigned to different objects.

In a further advantageous implementation in accordance with the first and second aspects, the two-dimensional image is ascertained in dependence on an occlusion and/or translucency of at least one of the ascertained objects of the three-dimensional scene. An occlusion and/or translucency, in particular a transparency, of objects can be taken into consideration. In particular, a transparent windshield can be taken into consideration in each case in a pixel description of the objects by way of an object identifier being assigned to the windshield. An object that is visible through the windshield, can thus be described by a pixel with at least two object identifiers. The tuple makes it possible to simultaneously take into consideration an order of the objects as well.

In a further advantageous implementation in accordance with the first and second aspects, the set of pixels has second pixels, which represent at least one portion of an object that is occluded by another object. Alternatively or in addition thereto, the second pixels can represent at least one portion of a translucent or transparent object. The first pixels and the second pixels can be identical pixels.

In a further advantageous implementation in accordance with the first and second aspects, a visibility of at least one of the ascertained objects of the three-dimensional scene is ascertained in dependence on the probability with which the at least one of the ascertained objects is located within the field of view of the driver. It is assumed here that a visibility of objects decreases with an increasing distance from a visual axis of the driver.

In a further advantageous implementation in accordance with the first and second aspects, the ascertained field of view has a plurality of field of view regions, and a probability with which the at least one object is located in a specific field of view region of the driver is ascertained. Dividing the ascertained field of view into different field of view regions makes it possible to more strongly differentiate the visibility and/or the visual perception of the driver.

In a further advantageous implementation in accordance with the first and second aspects, the respectively ascertained field of view represents an ascertained central field of view region, and the probability with which the at least one object is located in an "actual" central field of view region of the driver is ascertained. Alternatively thereto, the respectively ascertained field of view represents an ascertained peripheral field of view region, and the probability with which the at least one object is located in an "actual" peripheral field of view region of the driver is ascertained.

In a further advantageous implementation in accordance with the first and second aspects, a perception probability of the driver is ascertained for at least one of the ascertained objects of the three-dimensional scene, in dependence on the probability with which the at least one of the ascertained objects is located in the field of view of the driver. In addition, the perception probability can be ascertained in dependence on the visibility of the object.

For example, if an eye movement of the driver was recognized, it is possible to ascertain, depending on the eye movement, on the corresponding ascertained field of view, and on the visibility of an object, the perception probability with which the object was perceived by the driver. The perception probability can in particular be ascertained here in dependence on a specified model that is based on object-based visual attention. The theory of object-based attention is based on the assumption that attention is directed not at an abstract site, but rather at a specific object at a specific site, or that attention can be directed only at one or a few objects at any given time.

The periphery is treated with preference as compared to the retina center during information processing. For example, if an object or a movement suddenly appears in the periphery, central perception is suppressed in favor of the information from the periphery, and the attention is directed at the new detail. Head and eyes then re-orientate themselves by reflex onto the object to be analyzed (using eye movements). Subsequently, the better spatial resolution of the central vision can be used to analyze the situation. The peripheral vision thus has the function of detection.

In a further advantageous implementation in accordance with the first and second aspects, the ascertained probability and/or the ascertained visibility and/or the ascertained perception probability are provided for a specified driver assistance function, and the driver assistance function is performed in dependence on the ascertained probability and/or the ascertained visibility and/or the ascertained perception probability. In this way, the probability and/or the ascertained visibility and/or the ascertained perception probability can be provided for any desired driver assistance functions, such as for example in driver assistance functions for a partially automated driving mode, in which the human driver monitors the driving environment, but the driver is supported in specific driving situations by one or more driver assistance systems.

According to a third aspect, the invention is characterized by a computer program, wherein the computer program is configured to carry out the method for ascertaining a probability with which an object is located in a field of view of a driver of a vehicle, or to carry out an optional implementation of the method.

According to a fourth aspect, the invention is characterized by a computer program product, comprising an executable program code, wherein the program code, upon execution by a data processing apparatus, carries out the method for ascertaining a probability with which an object is located in a field of view of a driver of a vehicle or carries out an optional implementation of the method.

The computer program product in particular comprises a medium that is readable by the data processing apparatus and on which the program code is stored.

Exemplary embodiments of the invention will be explained in more detail below with reference to the schematic drawings.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 shows a two-dimensional image.

DETAILED DESCRIPTION OF THE DRAWINGS

Figure 1:
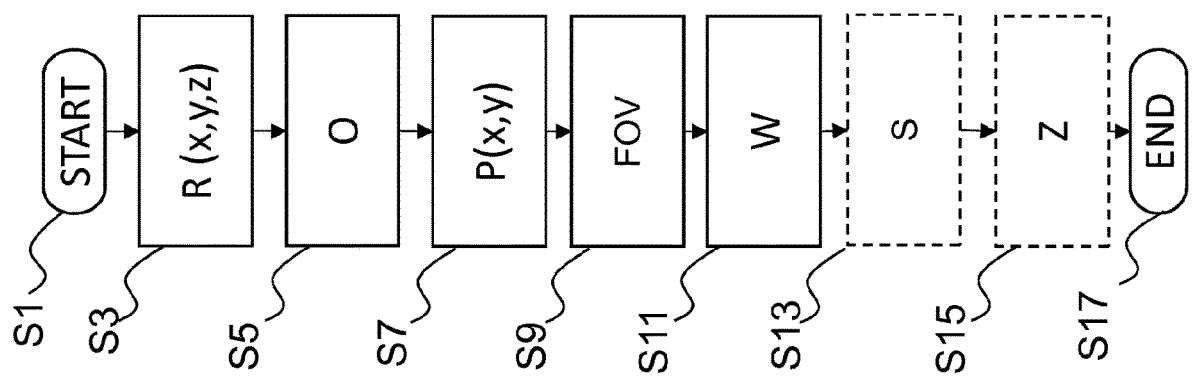
FIG. 1 shows a flowchart for ascertaining a probability with which an object is located in a field of view of a driver of a vehicle.

FIG. 1 shows a flowchart of a program for ascertaining a probability with which an object O is located in a field of view of a driver of a vehicle. The program can be worked through by an apparatus for ascertaining a probability with which an object O is located in a field of view of a driver of a vehicle.

For this purpose, the apparatus has in particular a computation unit, a program and data memory, and for example one or more communication interfaces. The program and data memory and/or the computation unit and/or the communication interfaces can be configured as one construction unit and/or distributed over a plurality of construction units.

To this end, the program for ascertaining a probability with which an object O is located in a field of view of a driver of a vehicle is in particular stored on the program and data memory of the apparatus.

The program is started in a step S1, in which variables can be initialized, if appropriate.

In a step S3, one or more objects O of a three-dimensional scene, which represents a specified environment inside and/or outside the vehicle, is ascertained in dependence on provided raw data R of the three-dimensional scene. Preferably, all objects O of the three-dimensional scene are ascertained. Ascertaining the objects O can but does not have to comprise object recognition, in which for example an object is recognized as a vehicle and another object is recognized as a traffic light.

The raw data R of the three-dimensional scene are ascertained and provided for example on the basis of a captured three-dimensional image. The three-dimensional image is typically obtained by at least one image capturing apparatus, for example a camera, of the vehicle. The image capturing apparatus is preferably configured to capture three-dimensional image data that comprise distance information or depth information. Raw data R can here comprise a virtual spatial model that defines at least the object O and also the position and viewing direction of a viewer. In addition, the virtual model can define material properties of the objects and light sources.

In a step S7, a two-dimensional image is ascertained in dependence on the provided raw data R of the three-dimensional scene in a manner such that the two-dimensional image maps the ascertained objects O of the three-dimensional scene on a surface of a sphere, wherein the two-dimensional image has a set of pixels P which each represent at least one portion of one or more of the ascertained objects O of the three-dimensional scene. A cyclops eye of the driver preferably forms the center of the sphere on whose surface the ascertained objects are mapped.

The set of the pixels P for example comprises first pixels, which each represent at least one portion of at least two of the ascertained objects O of the three-dimensional scene. The two-dimensional image is preferably ascertained in dependence on an occlusion and/or translucency of at least one of the ascertained objects O of the three-dimensional scene. The image capturing device is preferably arranged in an interior of the vehicle. The objects O outside the vehicle are therefore visible only through the windshield. Depending on the region of the windshield, the windshield can have a different translucency.

At least one portion of the pixels P therefore has for example a tuple with at least two object identifiers that are assigned to different objects O.

In a step S9, data FOV, which represent at least one ascertained field of view of the driver, are provided.

To this end, for example a viewing direction of the driver is ascertained using an interior camera for example in dependence on an ascertained viewing vector or an ascertained nose vector. Modern eye tracking apparatuses are for example camera sensors that output a three-dimensional viewing direction of a user. In addition, for example a head position of the user can be output.

The field of view of the driver can be ascertained in dependence on the viewing direction of the driver. In addition, a captured head pose and/or a captured head position of the driver can also be used herefor.

For at least one of the ascertained objects O, the probability with which the at least one ascertained object O is located in the "actual" field of view of the driver is ascertained, in a step S11, in dependence on the provided data FOV and the two-dimensional image.

To ascertain the probability, a region in the two-dimensional image that corresponds to the ascertained field of view of the driver is preferably ascertained, and it is ascertained, in dependence on a position of the object O in relation to the ascertained region, whether at least one of the ascertained objects O is located in the ascertained field of view of the driver.

The data FOV, which represent the at least one ascertained field of view, are stored for example in a bitmap. In order to assign the objects O to the at least one ascertained field of view, for example the two-dimensional image and the bitmap are overlaid, and the regions in the further bitmap that are overlaid by the objects O are ascertained.

Even in the case of high precision of the camera sensor, a vector describing the viewing direction of the driver cannot be determined precisely due to the individual eye anatomy (for example position of the fovea). The eye geometry cannot be captured by the camera sensor. If the eye geometry is not taken into consideration, the viewing direction measurement is thus imprecise.

Eye tracking apparatuses predominantly use head models. Such a head model is typically based on specific anatomical or physiological features such as eye angles, mouth angles, nasal tip, the relation of which with respect to one another generally differs from head type to head type. When determining the viewing direction and/or head pose, errors may therefore occur that negatively impact the field of view that is to be ascertained.

On account of the possible capturing and ascertaining errors of the eye tracking apparatus, a position of the ascertained field of view generally deviates from the position of the "real" field of view or of the "actual" field of view of the driver.

A first field of view and at least one further field of view, which deviates from the first field of view within a given tolerance range, are therefore preferably ascertained. The first and the at least one further field of view are stored for example in a bitmap. A probabilistic assignment of the object to the "actual" field of view of the driver is effected for example by multiple, weighted mutual overlaying of the bitmaps.

For example, the first ascertained field of view has a weight factor 70. The further ascertained field of view for example has a weight factor of 15, because it is assumed that the captured viewing direction on the basis of which the further ascertained field of view was ascertained has a higher probability of deviating from the actual viewing direction of the driver than in the case of the first ascertained field of view. If the object can then be assigned to only one, for example the at least one further, ascertained field of view, the probability that the object is located in the actual field of view of the driver is smaller than when the object can be assigned to the first ascertained field of view or even to both fields of view.

In an optional step S13, a visibility S and/or a perception probability Z of the at least one object O is ascertained in dependence on the ascertained probability.

In a further optional step S15, the ascertained probability and/or the ascertained visibility S and/or the ascertained perception probability Z are provided for a specified driver assistance function.

The program is terminated in a further step S17.

Figure 2:
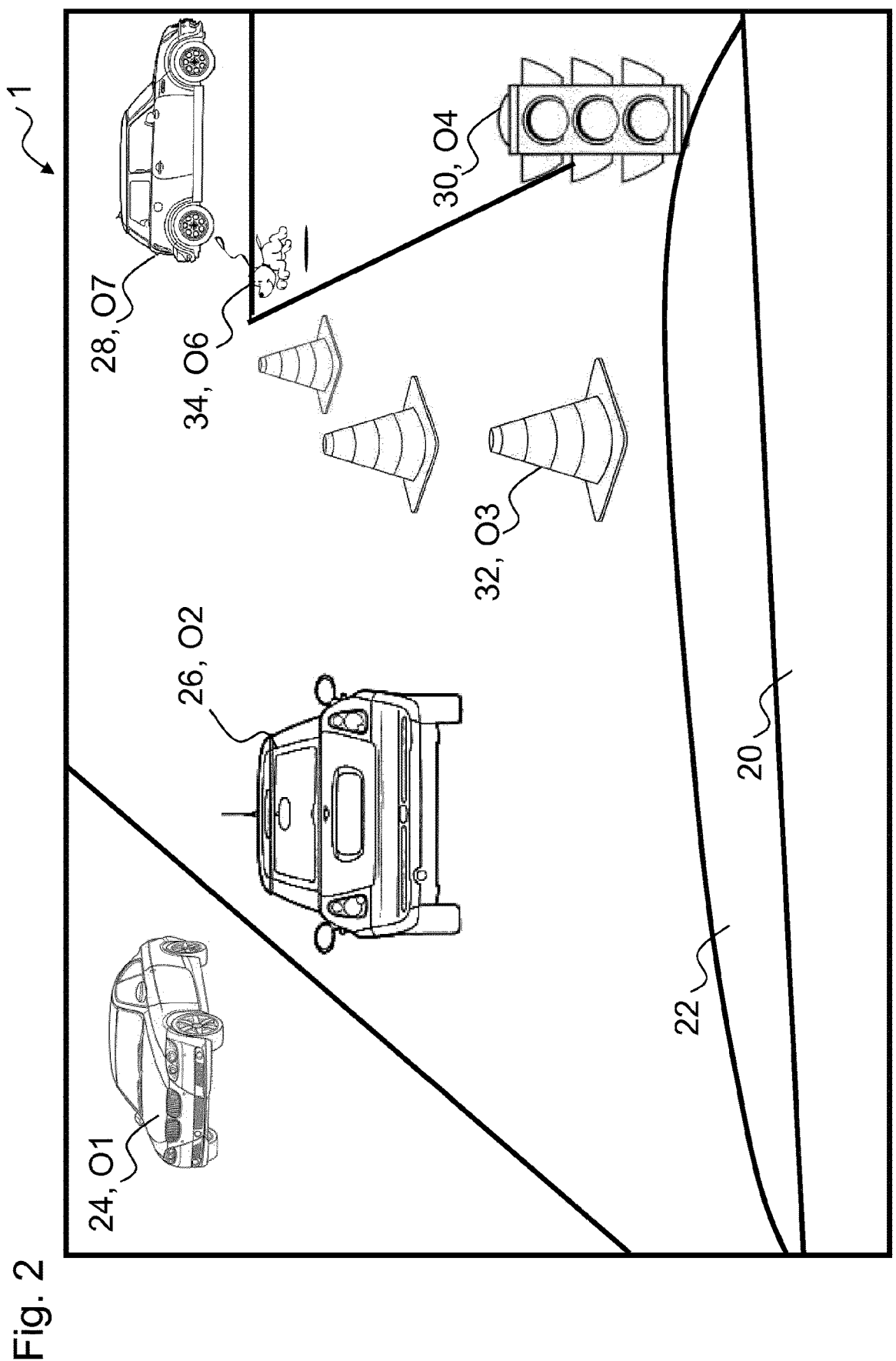
FIG. 2 shows an example of a traffic scene.

FIG. 2 shows an example of a traffic scene 1. The traffic scene 1 is captured for example using an image capturing apparatus, for example a 3D camera, of the vehicle. Alternatively, a 2D camera can be used, and the depth information is captured for example using different sensor apparatuses, for example using a radar apparatus and/or a lidar apparatus.

The traffic scene 1 is captured for example by an image capturing apparatus arranged in the interior of the vehicle. In the example shown in FIG. 2, the image capturing apparatus is oriented such that a portion of a dashboard 22 and a bonnet 20 of the vehicle can be seen. The traffic scene 1 comprises a plurality of objects O: an oncoming vehicle 24, a vehicle 26 driving ahead, a crossing vehicle 28, traffic lights 30, several traffic cones 32, and a dog 34.

Figure 3:
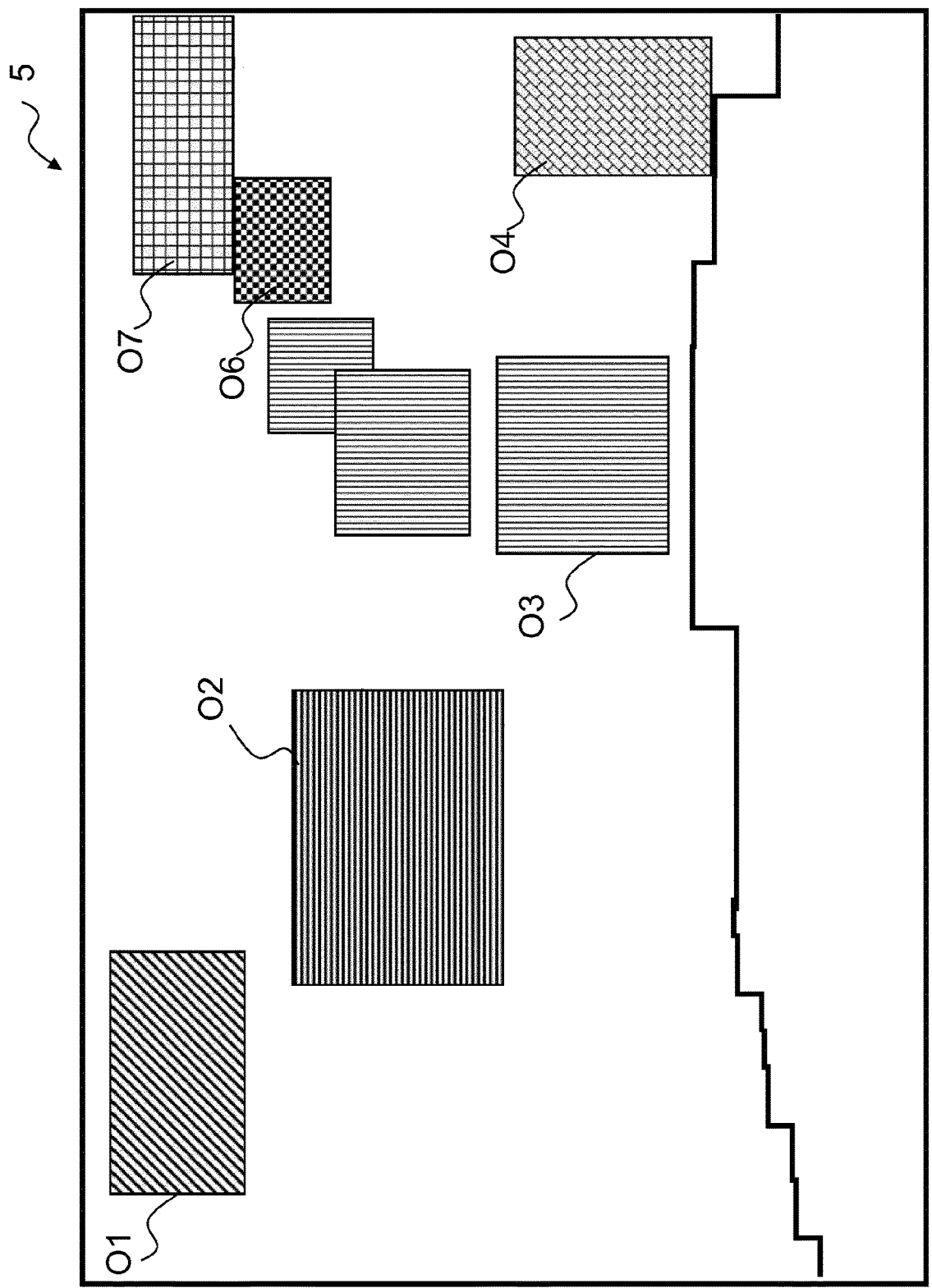
FIG. 3 shows an intermediate image.

FIG. 3 shows an intermediate image 5, which includes the rendered two-dimensional image. The objects O of the traffic scene 1 are represented in simplified fashion. For example, the objects are shown as cuboids in the three-dimensional scene. This simplified representation is then transformed into the two-dimensional image. The pixels P of the two-dimensional image have for example in each case tuples with two object identifiers. A majority of the pixels P for example also represent the windshield. Occluded objects are for example not listed in the tuples of the pixels P.

FIG. 4 shows the rendered two-dimensional image with an assignment of the object O to the sphere surface. FIG. 4 thus shows the rendered two-dimensional image with an overlaid field of view. The viewing direction of the driver is directed for example onto the vehicle driving ahead. The oncoming vehicle lies predominantly in a field of view region of 30° to 45°. The dog is located in a region of approximately 60° and is therefore perceivable only in peripheral vision. It is thus evident that the attention of the driver is not (yet) directed at the dog.

LIST OF REFERENCE CHARACTERS

1 Traffic scene
5 Intermediate image
7 Two-dimensional image
20 Bonnet
22 Dashboard
24 Oncoming vehicle
26 Vehicle driving ahead
28 Crossing vehicle
30 Traffic light
32 Traffic cones
34 Dog
FOV Data that are representative of an ascertained field of view
O Object
P Pixels
R Raw data
S Visibility
W Probability
Z Perception probability The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining object visibility to a driver of a vehicle, comprising the acts of:
   ascertaining one or more objects in a three-dimensional scene generated from raw data representing the vehicle environment;
   mapping the objects onto a curved surface so as to generate a two-dimensional image from the raw data, wherein the two-dimensional image includes a set of pixels corresponding to at least a portion of the mapped objects;
   providing field-of-view data defining a field-of-view of the driver in the curved surface, wherein the field-of-view data is based on at least one sensor captured driver variable; and
   determining a field-of-view probability for each of the objects based on the field-of-view in the curved surface and the two-dimensional image, wherein the field-of-view probability for each object is the probability that the object is in the field-of-view of the driver.

2. The method according to claim 1, wherein the curved surface is at least semi-spherical and centered on a cyclops eye of the driver.

3. The method according to claim 1, wherein the field-of-view probability is determined based on whether the object is at least partially located in a region of the curved surface corresponding to the field-of-view of the driver.

4. The method according to claim 1,
   wherein the field-of-view data defines a further field-of-view of the driver in the curved surface, which deviates from the field-of-view within a specified tolerance range,
   wherein respective weight factors are assigned to the field-of-view and the further field-of-view, and
   wherein the field-of-view probability is determined based on the respective weight factors.

5. The method according to claim 1, wherein at least one portion of the set of pixels has a tuple of object identifiers.

6. The method according to claim 1, wherein the set of the pixels comprises first pixels, each first pixel representing at least one portion of at least two of the objects.

7. The method according to claim 1, wherein the two-dimensional image is ascertained based on an occlusion and/or a translucency of the objects.

8. The method according to claim 1, further comprising:
   determining a visibility probability for each of the objects based on the field-of-view probability, wherein the visibility probability is the probability that the object is visible to the driver.

9. The method according to claim 1,
   wherein the field-of-view has a plurality of field-of-view regions, and
   wherein determining the probability that the object is visible to the driver includes determining a probability that the object is located in a field-of-view region of the plurality of field-of-view regions.

10. The method according to claim 9, wherein the field-of-view region corresponds to: a central field-of-view or a peripheral field-of-view.

11. The method according to claim 1, further comprising:
    determining a perception probability for each of the objects based on the field-of-view probability, wherein the perception probability is the probability that the object is seen by the driver.

12. The method according to claim 11, further comprising:
    determining a visibility probability for each of the objects based on the field-of-view probability, wherein the visibility probability is the probability that the object is visible to the driver;
    providing at least one of: the field-of-view probability, the visibility probability, and the perception probability to a driver assistance module configured to perform a driver assistance function based on the provided at least one of: the field-of-view probability, the visibility probability, and the perception probability.

13. An apparatus for determining object visibility to a driver of a vehicle, wherein the apparatus is configured to carry out the method according to claim 1.

14. A non-transitory computer readable medium, comprising an executable program code, wherein the program code, upon execution by a data processing apparatus, carries out the method according to claim 1.

* * * * *